Apr. 3, 1923.
W. L. HAMM
TIRE ARMOR
Filed Oct. 22, 1921
1,450,288
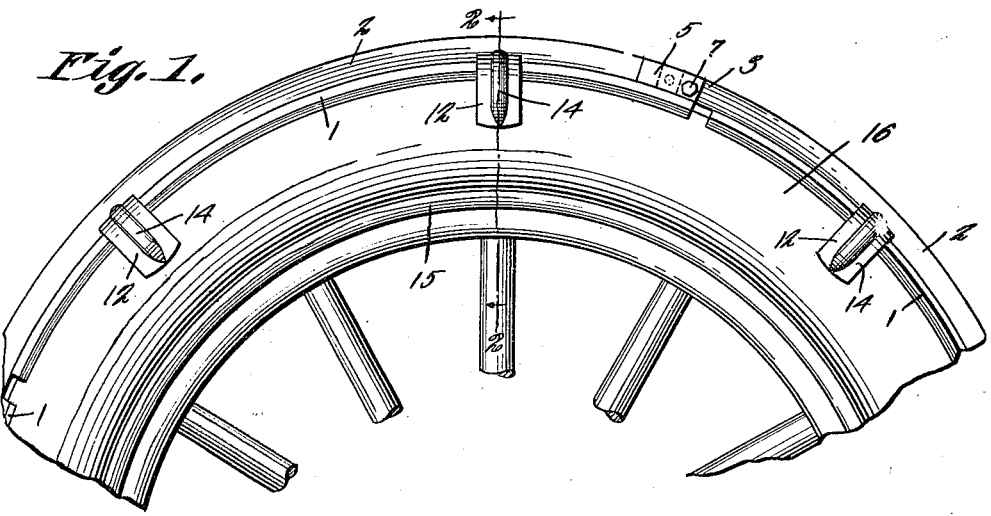
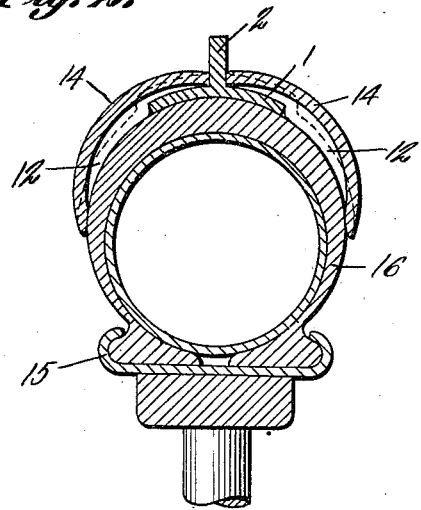
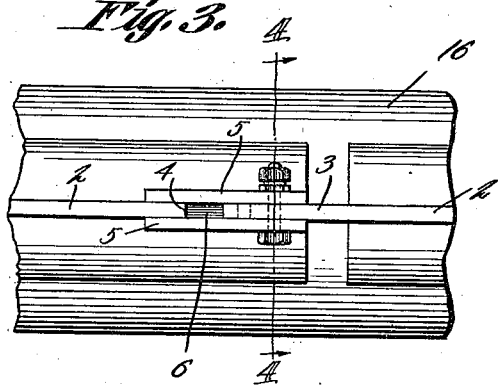
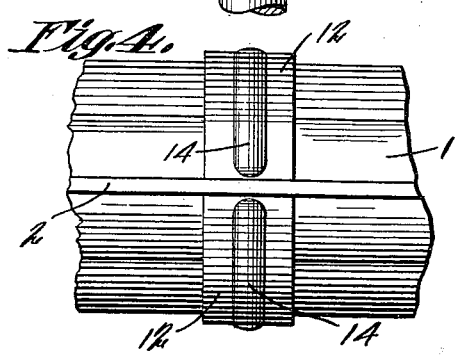
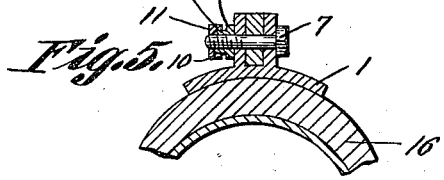
W. L. Hamm, Inventor
By C. A. Snow & Co., Attorneys Patented Apr. 3, 1923.

1,450,288

UNITED STATES PATENT OFFICE.

WILLIAM L. HAMM, OF OSKALOOSA, IOWA.

TIRE ARMOR.

Application filed October 22, 1921. Serial No. 509,600.

*To all whom it may concern:*

Be it known that I, WILLIAM L. HAMM, a citizen of the United States, residing at Oskaloosa, in the county of Mahaska and State of Iowa, have invented a new and useful Tire Armor, of which the following is a specification.

The device forming the subject matter of this application is intended to be used to prevent automobiles from skidding in the mud or snow.

The invention aims to provide a device of the kind mentioned which will have unusual strength, novel means being provided for attaching the device to a tire casing.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a portion of a wheel and casing, whereunto the device forming the subject matter of this application has been applied; Figure 2 is a cross section on the line 2—2 of Figure 1; Figure 3 is a fragmental plan showing the joined ends of the sections; Figure 4 is a cross section on the line 4—4 of Figure 3; and Figure 5 is a fragmental plan showing the clips.

The device forming the subject matter of this application comprises any desired number of sections, each including a body 1 which is curved transversely and longitudinally to fit on a tire casing 16 carried by a rim 15. Intermediate its edges, the body 1 is provided with an outstanding rib 2. The rib 2, at one end of the body 1 projects to form a finger 3 whereas, at the other end of the body, the rib is spaced from the said end of the body, as shown at 4. Plates 5 are secured to the body 1 and to the part 4 of the rib 2 and define a socket 6 wherein the finger 3 of an adjoining section is received, a securing device, such as a bolt 7, passing through the plates 5 and through the finger 3, to connect the sections. A nut 8 is threaded on the bolt 7 and has compressible fingers 9 received in a recess 10 formed in a lock nut 11 threaded on the bolt. Oppositely disposed arcuate clips 12 are secured to the body 1 and abut at their inner ends against the rib 2, the clips being pressed outwardly, as at 14 to form reinforcing ribs. The clips 12 are curved to conform to the cross section of the casing 16, and prevent the device from sliding transversely, off the casing.

All portions of the device, preferably, are made of metal. The construction is such that a secure hold will be afforded by the rib 2. The sections may be connected and disconnected without difficulty, the clips 12 preventing lateral movement of the device with respect to the casing 16.

It is to be observed that the outer ends of the clips 12 are free, meaning thereby that the clips are not in the form of straps or the like, extended about a rim, the outer ends being united. The clips 12 are not in the form of rigid blocks, but are made of thin metal, bulged outwardly to fashion the parts 14, and to form, on each side of the said parts, plane areas affording places of attachment between the clips and the body 1.

What is claimed is:—

A device of the class described comprising sections each including a body and an outstanding longitudinal rib; means for connecting the rib of one section to the rib of an adjoining section, and oppositely extended transverse metal clips having their inner ends mounted on the body, the outer ends of the clips being free and projecting beyond the longitudinal edges of the body, the clips being bulged outwardly to form reinforcing ribs disposed transversely with respect to the body and to form, on each side of the rib, plane areas affording places of attachment between the clips and the body.

In testimony that I claim the foregoing as my own, I have hereto affixed my signature in the presence of two witnesses.

WILLIAM L. HAMM.

Witnesses:
 ALFRED B. CRABTREE,
 R. L. JACOBS.